United States Patent
Lee et al.

(10) Patent No.: US 10,481,685 B2
(45) Date of Patent: Nov. 19, 2019

(54) METHOD FOR CONTROLLING DEVICE ON THE BASIS OF EYEBALL MOTION, AND DEVICE THEREFOR

(71) Applicant: SAMSUNG ELECTRONICS CO., LTD., Suwon-si (KR)

(72) Inventors: Jun-seok Lee, Seoul (KR); Kyung-hwa Yu, Seoul (KR); Sang-won Leigh, Yongin-si (KR); Jin-yong Chung, Seoul (KR); Sung-goo Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/864,745

(22) Filed: Jan. 8, 2018

(65) Prior Publication Data
US 2018/0129283 A1 May 10, 2018

Related U.S. Application Data

(63) Continuation of application No. 14/383,795, filed as application No. PCT/KR2013/001893 on Mar. 8, 2013, now Pat. No. 9,864,429.

(30) Foreign Application Priority Data

Mar. 8, 2012 (KR) .................. 10-2012-0024119

(51) Int. Cl.
*G06F 3/01* (2006.01)
*G06K 9/00* (2006.01)
(Continued)

(52) U.S. Cl.
CPC .............. *G06F 3/013* (2013.01); *G06F 3/017* (2013.01); *G06F 3/033* (2013.01); *G06F 3/0482* (2013.01);
(Continued)

(58) Field of Classification Search
None
See application file for complete search history.

(56) References Cited

U.S. PATENT DOCUMENTS 6,603,491 B2  8/2003  Lemelson et al.
6,637,883 B1  10/2003 Tengshe et al.
(Continued)

FOREIGN PATENT DOCUMENTS

JP        07049744 A     2/1995
KR     1020000072494 A   5/2000
(Continued)

OTHER PUBLICATIONS

Communication dated Jun. 19, 2018, issued by the Korean Intellectual Property Office in counterpart Korean Patent Application No. 10-2012-0024119.
(Continued)

*Primary Examiner* — Joseph R Haley
*Assistant Examiner* — Emily J Frank
(74) *Attorney, Agent, or Firm* — Sughrue Mion, PLLC

(57) ABSTRACT

A method of controlling an operation of a display device using eye movements and a device for performing the method are provided. The method includes receiving eye movement information of a user; receiving blinking information of the user; generating a control command corresponding to the eye movement information and the blinking information; and controlling an operation of the display device based on the generated control command.

17 Claims, 14 Drawing Sheets

(51) Int. Cl.
*G06F 3/0485* (2013.01)
*G06F 3/0482* (2013.01)
*G06F 3/033* (2013.01)
*G06F 3/0484* (2013.01)

(52) U.S. Cl.
CPC .......... *G06F 3/0484* (2013.01); *G06F 3/0485* (2013.01); *G06K 9/00597* (2013.01)

(56) References Cited

U.S. PATENT DOCUMENTS

| | | | |
|---|---|---|---|
| 9,864,429 B2* | 1/2018 | Lee | G06F 3/013 |
| 2002/0105482 A1 | 8/2002 | Lemelson | |
| 2002/0180799 A1 | 12/2002 | Peck et al. | |
| 2009/0289895 A1* | 11/2009 | Nakada | G06F 3/013 |
| | | | 345/157 |
| 2011/0175932 A1 | 7/2011 | Yu et al. | |
| 2012/0019662 A1* | 1/2012 | Maltz | G06F 3/013 |
| | | | 348/158 |
| 2012/0105486 A1 | 5/2012 | Lankford | |
| 2012/0146891 A1* | 6/2012 | Kalinli | H04N 19/33 |
| | | | 345/156 |
| 2012/0162603 A1 | 6/2012 | Dejima | |
| 2012/0256967 A1* | 10/2012 | Baldwin | G06F 3/013 |
| | | | 345/684 |
| 2013/0009868 A1 | 1/2013 | Sako et al. | |
| 2013/0169530 A1 | 7/2013 | Bhaskar | |

FOREIGN PATENT DOCUMENTS

| | | | |
|---|---|---|---|
| KR | 1020060027717 A | | 3/2006 |
| KR | 1020070043469 A | | 4/2007 |
| KR | 1020090050069 A | | 5/2009 |
| KR | 1020110083770 A | | 7/2011 |

OTHER PUBLICATIONS

Communication dated Jun. 17, 2014, issued by the International Search Authority in counterpart International Application No. PCT/KR2013/001893.

Communication dated Dec. 26, 2017, issued by the Korean Intellectual Property Office in corresponding Korean Application No. 10-2012-0024119.

* cited by examiner

| EYE ACTION | |
|---|---|
| open | KEEPING EYES OPEN |
| blink | QUICKLY BLINKING EYES |
| short_click | CLOSING EYES SHORTLY AND OPENING THEM AGAIN |
| click | OPENING EYES AFTER CLOSING THEM (CLICK) |
| long_click | OPENING EYES AFTER CLOSING THEM FOR LONG PERIOD OF TIME |
| close | KEEPING EYES CLOSED |
| dwell | GAZING ONE SPOT FOR LONG PERIOD OF TIME |

METHOD FOR CONTROLLING DEVICE ON THE BASIS OF EYEBALL MOTION, AND DEVICE THEREFOR

CROSS-REFERENCE TO RELATED PATENT APPLICATION(S)

This application is a Continuation Application of Ser. No. 14/383,795, filed Sep. 8, 2014, which is a National Stage application of International Patent Application No. PCT/KR2013/001893, filed on Mar. 8, 2013, which claims the benefit of Korean Patent Application No. 10-2012-0024119, filed on Mar. 8, 2012, in the Korean Intellectual Property Office, the entire disclosures of which are incorporated herein by reference.

BACKGROUND

1. Field

Apparatuses and methods consistent with exemplary embodiments relate to a method of controlling a device based on eye movements and a device for performing the method, and more particularly, to a method of controlling a device by blinking an eye of a user and a device for performing the method.

2. Description of Related Art

A mouse is a computer input device that operates such that when the mouse is moved, a cursor on a display screen also moves, and when a mouse button is pressed, a command is executed. Due to this relatively simple usage, a mouse is widely used as an input device along with a keyboard for inputting commands.

A mouse is classified into a ball mouse, an optical mouse, and a gyroscopic mouse (air mouse) according to a driving method thereof. A ball mouse is a type of a mechanical mouse which includes a small ball that is rolled to move a cursor in corresponding directions and distances. However, foreign substances can attach to the ball causing the sensitivity of the ball mouse to be reduced.

In an optical mouse, light is emitted from an optical sensor mounted on the bottom of the optical mouse to sense motion changes of the optical mouse according to the reflected light. The optical mouse is currently the most popularly used mouse. The optical mouse is classified into an optical mouse, a laser mouse, and a blue track mouse according to a sensor thereof.

A gyroscopic mouse is a mouse which does not require ground contact. The gyroscopic mouse includes a gyroscopic sensor to sense three-dimensional (3D) motions in the X, Y, and Z axes according to an inclination of the gyroscopic mouse. A wireless type gyroscopic mouse has recently been introduced. The gyroscopic mouse is also referred to as an "air mouse" because it can be used in the air.

However, it is difficult for people with motion disabilities to use any of the above-mentioned mice as an input device. Accordingly, an eye mouse has been developed. An eye mouse is a special mouse which may be used by disabled people, and which is designed to move a computer cursor according to the motion of pupils.

SUMMARY

One or more exemplary embodiments provide a method of controlling a device using information about eye movement and eye blinking and a device for executing the method.

One or more exemplary embodiments also provide a method of controlling a device based on a user's gaze at divided portions of a screen and gaze movement, and a device for performing the method.

One or more exemplary embodiments also provide a method of controlling a device, whereby a position of a cursor on a screen is corrected and the cursor is minutely moved, and a device for performing the method.

According to an aspect of the present invention, there is provided a method of controlling an operation of a display device based on eye movements of a user, the method including receiving eye movement information of a user, receiving blinking information of the user, generating a control command corresponding to the eye movement information and the blinking information, and controlling an operation of the device based on the generated control command.

A position of a gaze of the user and a movement direction of the gaze may be checked based on the eye movement information and a control command may be generated based on a position of the gaze, a movement direction of the gaze, and the blinking information.

The method may further include dividing a display of the display device into a plurality of areas, and the generating may include generating the control command based on an area gazed at by the user from among the divided areas and a movement direction of the gaze of the user from the area gazed at by the user.

The dividing may include dividing the display based on an area where contents are displayed on the display of the device.

The generating may include generating a control command based on a movement of a gaze of the user from the display to an area outside of the display.

The method may further include displaying a control command selection window including a list of control commands on a display of the device, sensing a selection of a control command from the control command list included in the control command selection window based on a user input via the displayed control command selection window, and moving a cursor on the display of the device to a predetermined object based on the eye movement information of the user, and the generating may include generating a control command corresponding to the selected control command with respect to the object in response to eye blinking by the user.

The method may further include fixing a position of a cursor corresponding to a gaze of the user, and moving a position of the cursor to a moved position of the gaze of the user, in response to a movement of the gaze of the user.

The method may further include displaying a previously set area around a cursor based on a user input, and moving a cursor based on a position of a gaze of the user with respect to the displayed area.

The method may further include moving a cursor to an object in response to the cursor being moved based on the eye movement information to an area that is located within a previously set range from the object on the display of the device.

According to another aspect of the present invention, there is provided a device for controlling an operation of a device based on eye movements of a user, the device including an eye movement information receiver to receive information about eye movements of a user, a blinking information receiver to receive information about eye blinking of the user, and a control command generator to generate a control command corresponding to the eye movement information and the blinking information, and control an operation of the device based on the control command.

The control command generator may determine a position of a gaze of the user and a movement direction of the gaze based on the eye movement information, and generate the control command based on the position of the gaze, the movement direction of the gaze, and the blinking information.

According to another aspect of the present invention, there is provided a non-transitory computer readable medium that has a computer program for performing the method described above.

BRIEF DESCRIPTION OF THE DRAWINGS

The above and other features and advantages will become more apparent by describing the exemplary embodiments thereof with reference to the attached drawings in which.

DETAILED DESCRIPTION

Figure 1:
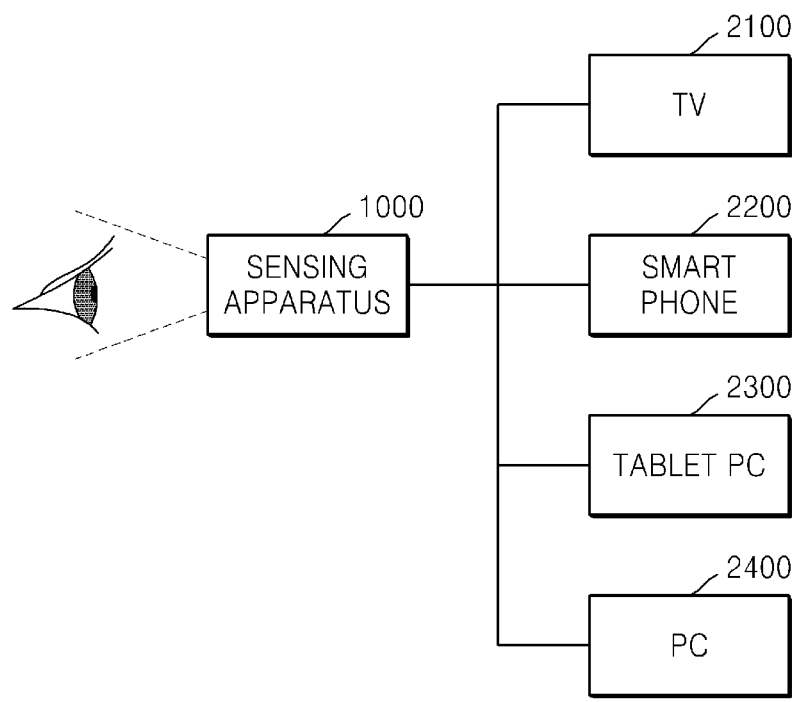
FIG. 1 is a diagram illustrating a system for controlling a device using eye movements of a user according to an embodiment.

The attached drawings for illustrating exemplary embodiments of the are referred to in order to gain a sufficient understanding of the present description, the merits thereof, and the objectives accomplished by the implementation of the present description. Hereinafter, the present description will be presented in detail by explaining exemplary embodiments with reference to the attached drawings. Like reference numerals in the drawings denote like elements. Expressions such as "at least one of," when preceding a list of elements, modify the entire list of elements and do not modify the individual elements of the list.

In the present specification, when a constituent element "connects" or is "connected" to another constituent element, the constituent element contacts or is connected to the other constituent element not only directly but also electrically through at least one of other constituent elements interposed therebetween. Also, when a part may "include" a certain constituent element, unless specified otherwise, it may not be construed to exclude another constituent element but may be construed to further include other constituent elements.

FIG. 1 is a diagram illustrating a system for controlling a device based on eye movements of a user according to an embodiment.

As illustrated in FIG. 1, a sensing apparatus 1000 may sense eye movements and eye blinking of a user, and a plurality of devices connected to the sensing apparatus 1000 may respectively and independently operate based on the sensed eye movements and eye blinking information. Examples of the device include a TV 2100, a smart phone 2200, a tablet PC 2300, and a PC 2400. Also, the device may be a laptop computer, an electronic book (E-book) terminal, a smart TV, a digital broadcasting terminal, a personal digital assistant (PDA), a portable multimedia player (PMP), or a navigation device, but is not limited thereto.

The sensing apparatus 1000 may obtain data about eye movements and eye blinking of the user. The eye movement data may include information about at least one of an eye gaze position and an eye movement speed. Also, the eye blinking data may include information about at least one of an eye blinking speed and the number of times of blinking the eyes.

Also, the sensing apparatus 1000 may obtain data about eye movements and eye blinking of the user using an eye-tracker that includes an infrared light-emitting diode (LED) and a camera. Also, the sensing apparatus 1000 may be included in glasses that are worn by the user or attached thereto, but is not limited thereto.

When the infrared LED is placed close to an axis of a camera, pupils usually reflect light on a retina which is filled with blood, and thus, the pupils look brighter than usual. This is called a bright pupil effect, and may be useful in detecting and tracking the pupils of the eyes.

If an infrared LED (on-axis LED) installed close to the camera is turned on, the eye-tracker obtains an image from an area where the pupils shine bright, and if an infrared LED (off-axis LED) installed far from the camera is turned on, the eye-tracker may obtain an image from an area where the pupils do not shine. The eye-tracker first converts the images into a black-white image so that the pupils of the brightly shining eyes may be detected from the two images, and calculates a difference between the two images to detect an eye action.

Although the sensing apparatus 1000 illustrated in FIG. 1 is described as a separate apparatus from the plurality of devices, the sensing apparatus 1000 may also be included in one or more of the plurality of devices.

Figure 2:
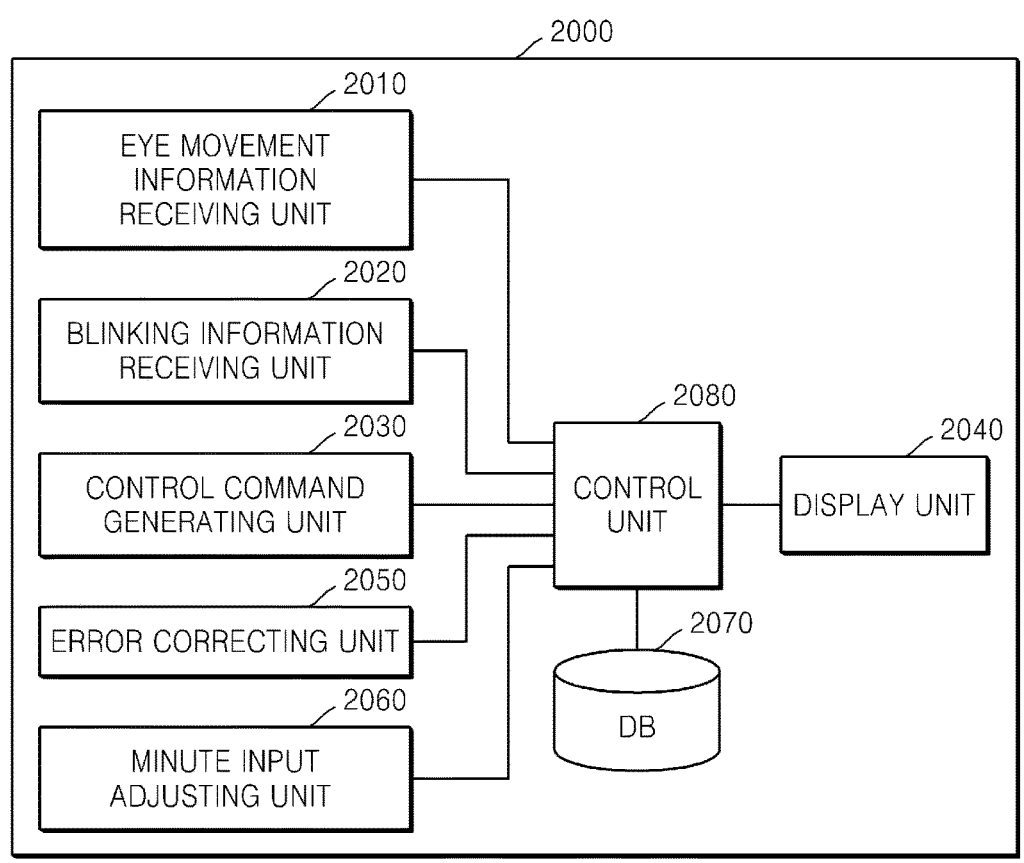
FIG. 2 is a diagram of a device according to an embodiment.

FIG. 2 is a diagram of a device 2000 according to an embodiment.

As illustrated in FIG. 2, the device 2000 includes an eye movement information receiving unit 2010, a blinking information receiving unit 2020, a control command generating unit 2030, a display unit 2040, an error correcting unit 2050, a minute input adjusting unit 2060, a database (DB) 2070, and a control unit 2080.

The eye movement information receiving unit 2010 receives information about eye movements of the user from the sensing apparatus 1000. Eye movement information includes information about movement of the pupils of the user. Also, the eye movement information may be used in determining a position of a gaze of the user and a movement speed of the gaze. A position of the gaze of the user on a screen of the device 2000, a movement direction of the gaze of the user on the screen, and a movement speed of the gaze may be determined based on movement of the eyes.

The blinking information receiving unit 2020 receives information about blinking of the eyes of the user from the sensing apparatus 1000. The information about the blinking of the eyes may include information about a speed of the blinking of the eyes and the number of times of the blinking. Also, various types of events may be matched to the blinking speed and the number of blinking times.

The control command generating unit 2030 generates a control command for the device 2000 based on eye movement information and blinking information. The control command generating unit 2030 may generate a control command corresponding to a combination of at least two of a position of a gaze of the user on a screen, a movement direction of the gaze of the user on the screen, a movement speed, a blinking speed, and the number of blinking times.

The control command generating unit 2030 may divide a screen of the device 2000 into a plurality of areas and determine the divided areas that the user gazes at. Also, the control command generating unit 2030 may check a change in the areas gazed at by the user. Also, the control command generating unit 2030 may set a control command corresponding to a combination of at least two of a change in the areas gazed at by the user, a blinking speed, and the number of blinking times.

The control command generating unit 2030 may generate a command to move a cursor, a command to select a predetermined object on a screen, or a command to execute a predetermined operation of the device 2000, based on eye movements and blinking information of the user. An object refers to an object that is selectable on a display screen by the user. The object may be, for example, an icon, an image, and a text, but is not limited thereto.

The control command generating unit 2030 is further described with reference to FIG. 3.

The display unit 2040 displays a user interface on a screen in order to receive a user input using the device 2000. The display unit 2040 may move a cursor on the screen according to an eye movement, and may display a control selection window via which a predetermined control command is to be generated. The control selection window may include a list of control commands corresponding to eye blinking, and include, for example, a list of at least one control command such as a right click, a left click, dragging, and scrolling. Accordingly, the device 2000 may generate a control command to select a predetermined object via a right click when the user selects a right click on a control command selection window using the eyes, moves a cursor to a predetermined object on the screen, and then blinks.

Also, the display unit 2040 may display a user interface on the screen such that the error correcting unit 2050 may correct a position of a cursor corresponding to a gaze of the user. Also, the display unit 2040 may display a user interface on the screen such that the minute input adjusting unit 2060 may minutely move a cursor.

Also, when a predetermined object is displayed on the screen and a cursor is located within a previously set range from the object, the display unit 2040 may move the cursor to the position of the object and display the same there. For example, when a cursor is located within 10 pixels from an input window for inputting a web site address, the display unit 2040 may move the cursor to an area within an address inputting window and display the same there.

The error correcting unit 2050 corrects a position of a cursor corresponding to a gaze of the user. The error correcting unit 2050 may correct a position of a cursor by fixing the position of the cursor on a screen and matching the current position of the gaze of the user with the fixed cursor. For example, when the user keeps their eyes closed for a previously set period of time, the device 2000 may fix the position of the cursor on the screen in order to correct the position of the cursor, and may receive information about the position of the cursor on the screen to correct the position of the cursor. Also, the error correcting unit 2050 may match a position of a fixed cursor and a position of the gaze of the user with the fixed cursor, thereby correcting the position of the cursor corresponding to the gaze of the user. In this case, a predetermined user interface for correcting a cursor position may be displayed on the screen.

The minute input adjusting unit 2060 minutely moves a cursor on the screen. The minute input adjusting unit 2060 may minutely move a cursor based on a direction of the gaze of the user with respect to a predetermined area displayed on the screen at the position of the cursor. For example, the display unit 2040 may display a previously set area around the cursor as a rectangle on the screen. Also, when the gaze of the user is located at the right side of the rectangle displayed on the screen, the minute input adjusting unit 2060 may move the cursor to the right side of the rectangle at a speed equal to or lower than a previously set speed.

The DB 2070 stores various information so that an operation of the device 2000 may be controlled based on eye movement information of the user. The DB 2070 may store various types of eye movement information and blinking information, and store set values of control commands corresponding to a combination of various types of eye movement information and blinking information.

The control unit 2080 controls the eye movement information receiving unit 2010, the blinking information receiving unit 2020, the control command generating unit 2030, the display unit 2040, the error correcting unit 2050, the minute input adjusting unit 2060, and the DB 2070 such that the device 2000 may be controlled based on eye movement information of the user.

Figure 3:
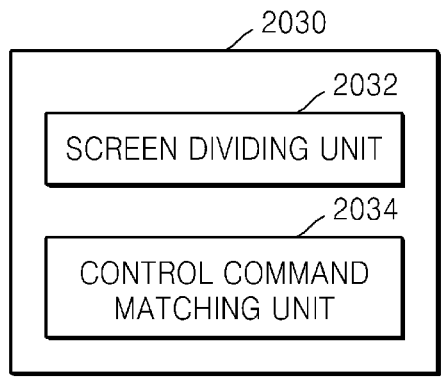
FIG. 3 is a diagram illustrating a control command generating unit according to an embodiment.

FIG. 3 is a diagram illustrating the control command generating unit 2030 according to an embodiment.

As illustrated in FIG. 3, the control command generating unit 2030 includes a screen dividing unit 2032 and a control command matching unit 2034.

The screen dividing unit 2032 divides a screen of the device 2000 into a plurality of areas. The screen dividing unit 2032 may divide an area inside the screen of the device 2000 into a plurality of areas. For example, the screen dividing unit 2032 may divide the area inside the screen of the device 2000 into nine areas. The screen dividing unit 2032 may divide the area inside the screen into an upper left area, an upper central area, an upper right area, a central left area, a central center area, a central right area, a lower left area, a lower central area, and a lower right area. Also, for example, the screen dividing unit 2032 may set a horizontal central area by combining the central left area, the central center area, and the central right area, from among the nine areas. In addition, for example, the screen dividing unit 2032 may set a vertical central area by combining the upper central area, the central center area, and the lower right area, from among the nine areas.

In addition, the screen dividing unit 2032 may divide an area of the screen except an area in which contents are displayed. When predetermined contents are displayed at the center of the screen, the screen dividing unit 2032 may divide an edge area except the area where the contents are displayed into an upper left edge area, an upper central edge area, an upper right edge area, a central left edge area, a central right edge area, a lower left edge area, a lower central edge area, and a lower right edge area. In this case, when a cursor or a gaze of the user is located on the edge areas other than the area where the contents are displayed, a control command based on eye movements of the user may be generated.

Also, the screen dividing unit 2032 may divide an area outside a screen of the device 2000. For example, the screen dividing unit 2032 may divide the area outside the screen into an outer-screen left area, an outer-screen right area, an outer-screen upper area, and an outer-screen lower area.

The control command matching unit 2034 matches a predetermined control command with an eye movement and eye blinking of the user. The control command matching unit 2034 may distinguish an event from at least one of an area gazed at by the user from among the divided areas of the screen of the device 2000, the number of times the user blinks, and a blinking speed, and may match a control command with each event.

For example, the control command matching unit 2034 may generate a control command to increase a volume of the device 2000 when the user quickly blinks while gazing at the upper central area of the screen of the device 2000.

Also, for example, when the user moves a gaze from the central right area of the screen of the device 2000 to the right outside of the screen, the control command matching unit 2034 may generate a control command to move a list of contents that are aligned horizontally on the screen of the device 2000 to the right.

Figure 4:
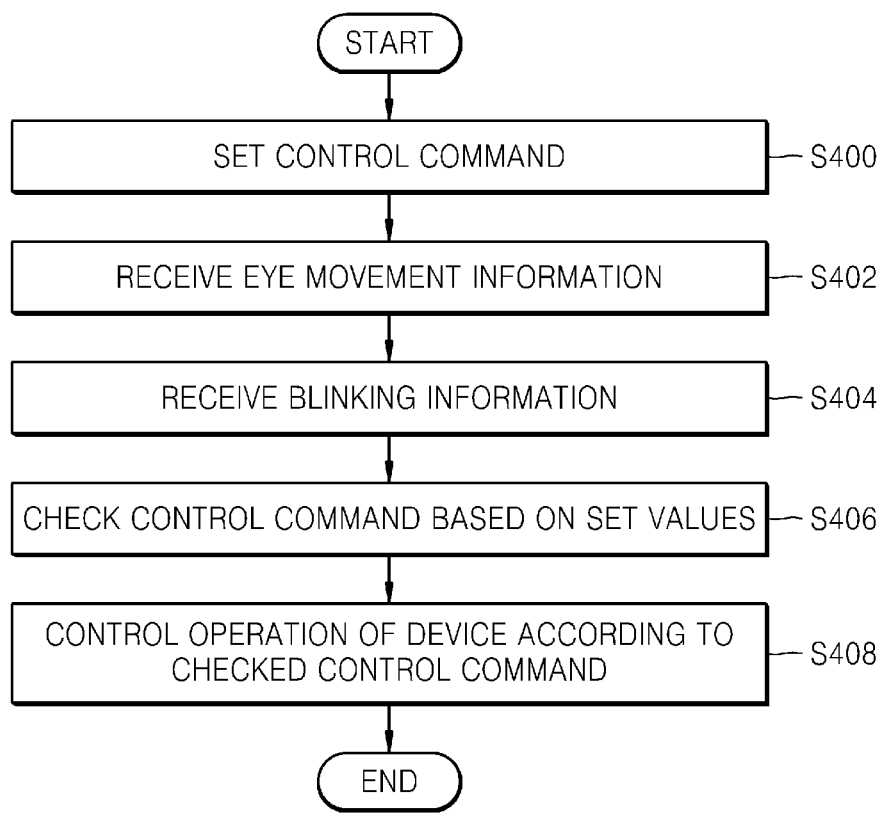
FIG. 4 is a flowchart illustrating a method of controlling a device based on eye movements of a user according to an embodiment.

FIG. 4 is a flowchart illustrating a method of controlling the device 2000 based on eye movements of a user according to an embodiment.

Referring to FIG. 4, in operation S400, the device 2000 sets a control command. In operation S400, the device 2000 may match a predetermined control command with eye movements and eye blinking of the user. The device 2000 may distinguish an event based on at least one of an area gazed at by the user from among divided areas of a display screen, a direction in which the gaze of the user is moved with respect to the divided areas, a movement speed of the gaze, and eye blinking, and may match a control command with each event. Also, in operation S400, the device 2000 may match different control commands with each event according to a type of the device 2000, an application type, and a type of a user interface. In addition, an area inside and an area outside the device 2000 may be divided into a plurality of areas as previously described.

For example, when a multimedia application is being executed by the device 2000 and the user blinks once while gazing at a central upper area of the screen of the device 2000, the device 2000 may generate a control command to increase a volume of the device 2000. As another example, when a list of contents is displayed on the screen of the device 2000 and the user moves the gaze from the central right area of the screen of the device 2000 to the right outside the screen, the device 2000 may generate a control command to move the list of contents that are aligned horizontally on the screen of the device 2000 to the right.

In operation S402, the device 2000 receives eye movement information. For example, the device 2000 may receive information about eye movements of the user from the sensing apparatus 1000. The eye movement information includes information about movements of the pupils of the eyes of the user. Also, the eye movement information may be used in determining a position of a gaze of the user and a movement speed of the gaze based on movements of the eyes. A position of a gaze of the user on the screen of the device 2000, a movement direction of the gaze of the user on the screen, and a movement speed of the gaze, may be determined based on movements of the eyes.

In operation S404, the device 2000 receives eye blinking information. For example, the device 2000 may receive information about eye blinking performed by the user, from the sensing apparatus 1000. The information about eye blinking may include a blinking speed and the number of blinks.

In operation S406, the device 2000 checks a control command based on the set values. For example, the device 2000 may determine an area gazed at by the user from among the divided areas of a display screen, a movement direction in which the gaze of the user moves with respect to the divided areas, a movement speed of the gaze, and eye blinking, based on the received information about eye movements and eye blinking. Also, the device 2000 may check a control command corresponding to at least one of an area gazed at by the user from among divided areas of a display screen, a movement direction in which the gaze of the user moves with respect to the divided areas, the number of blinks, and a movement speed of the gaze, based on the set values.

In operation S408, the device 2000 controls an operation of the device 2000 according to the checked control command which is based on eye movement and eye blinking of the user. For example, the device 2000 may generate a checked control command, and control an operation of the device 2000 using the generated control command.

Figure 5:
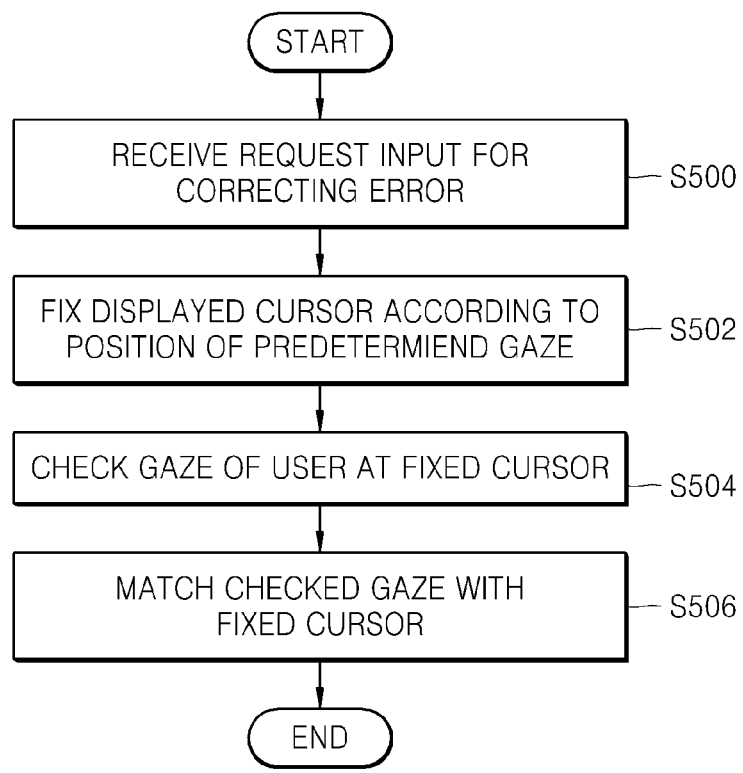
FIG. 5 is a flowchart illustrating a method of correcting a position of a cursor corresponding to a user's gaze using a device according to an embodiment.

FIG. 5 is a flowchart illustrating a method of correcting a position of a cursor corresponding to a gaze of the user using the device 2000 according to an embodiment.

Referring to FIG. 5, in operation S500, the device 2000 receives a user input that requests correction of an error of a cursor position. For example, when the user gazes at a predetermined position of a screen of the device 2000 and does not blink, the device 2000 may correct the cursor position displayed on the device 2000.

In operation S502, the device 2000 fixes a position of a cursor according to a position of a predetermined gaze. For example, the device 2000 may fix the cursor displayed on the screen upon receiving a user input that requests correction of an error. After the cursor is fixed, the cursor may not move on the screen in response to an eye movement of the user.

In operation S504, the device 2000 checks a gaze of the user at the fixed cursor. After the cursor is fixed, the user may move the gaze to the fixed cursor by moving their eyes. Also, the user may blink once after moving the gaze to the cursor, and the device 2000 may check the position of the gaze when the user blinks.

In operation S506, the device 2000 matches the checked gaze with the fixed cursor. As the gaze in operation S506 is matched with the fixed cursor, the position of the gaze of the user from this instant of time and the position of the cursor may be consistent with each other.

Figure 6:
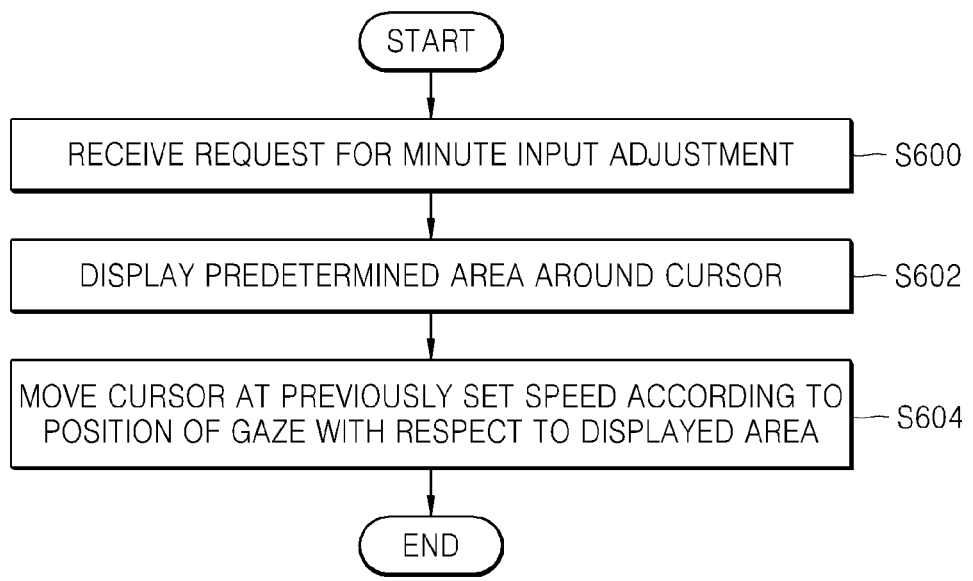
FIG. 6 is a flowchart illustrating a method of minutely moving a cursor using a device according to an embodiment.

FIG. 6 is a flowchart illustrating an example of a method of minutely moving a cursor using the device 2000 according to an exemplary embodiment.

Referring to FIG. 6, in operation S600, the device 2000 receives a user input that requests a minute input adjustment. For example, when the user keeps their eyes closed for 1.5 second or longer and then opens them again, the device 2000 may minutely move the cursor displayed on the device 2000 based on eye movements performed by the user after the user opens their eyes.

In operation S602, the device 2000 displays a predetermined area around the cursor. In this example, as a user input that requests a minute input adjustment is received, the device 2000 may display the predetermined area around the cursor with a rectangular frame.

In operation S604, the device 2000 moves the cursor at a previously set speed according to a position of the gaze of the user based on the displayed area. For example, when the gaze of the user is located at the right side of the rectangular frame displayed around the cursor, the device 2000 may move the cursor to the right at a speed equal to or slower than a previously set speed. As another example, when the gaze of the user is located at the left side of the rectangular frame displayed around the cursor, the device 2000 may move the cursor at a speed equal to or slower than a previously set speed.

Figures 7, 8A:
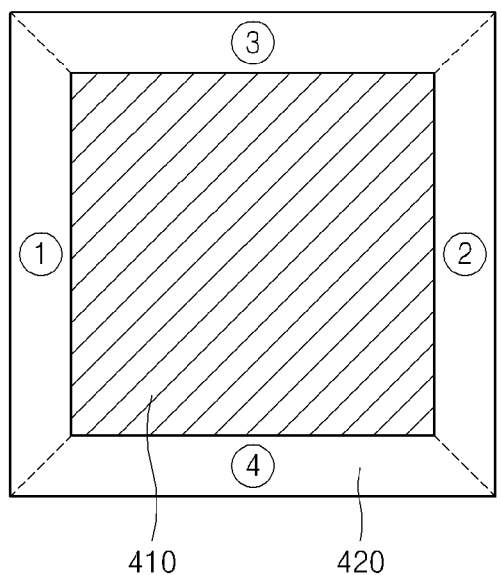
FIG. 7 is a diagram illustrating various eye actions according to an embodiment.
FIGS. 8A through 8C illustrate examples of a screen that is divided according to embodiments, wherein a user may gaze at various areas in and out of the screen, and various types of control commands may be generated based on a position and movement of a user's gaze of a user.

FIG. 7 is a diagram illustrating various eye actions according to an embodiment.

As illustrated in FIG. 7, examples of eye blinking or eye actions according to the current embodiment may include an operation of keeping the eyes open (open), an operation of blinking the eyes (blink), an operation of closing the eyes for a short period and opening them again (short_click), an operation of opening the eyes after closing them (click), an operation of closing the eyes for a long period and opening them again (long_click), an operation of keeping the eyes closed (close), and an operation of gazing at a predetermined area of a screen for a predetermined period of time or longer (dwell). Also, the eye blinking may be classified based on a speed of opening the eyes after closing them. Also, the eye blinking may be combined with information about eye movements and used by the device 2000 for distinguishing various types of user inputs.

Figure 8B:
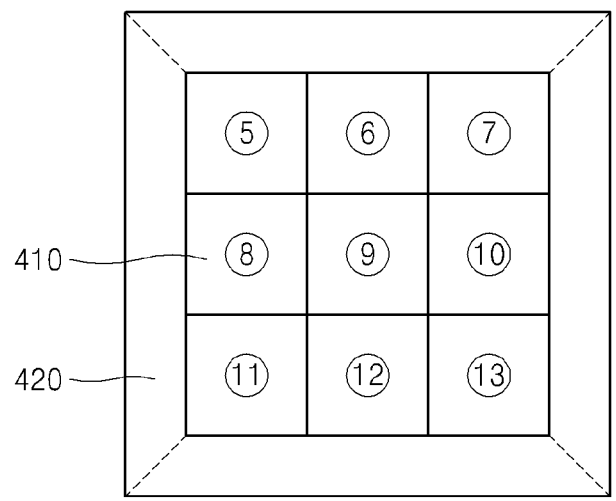
Figure 8C:
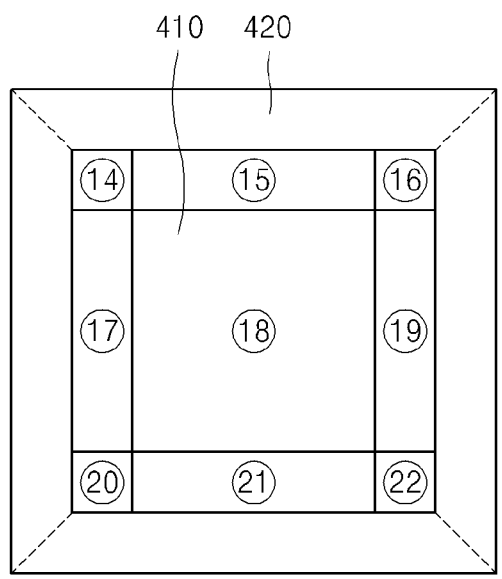

FIGS. 8A through 8C illustrates examples of a screen that is divided according to embodiments, wherein a user may gaze at various areas in and out of the screen, and various types of control commands may be generated based on a position and a movement of a gaze of a user.

FIG. 8A illustrates an area 420 outside of a screen. The area 420 outside a screen may include an outer-screen left-side area 1, an outer-screen right-side area 2, an outer-screen upper area 3, and an outer-screen lower area 4.

FIG. 8B illustrates an area 410 inside of a screen, which is uniformly divided. Although the screen is divided into nine portions in FIG. 8B, the number of divided portions of the screen is not limited thereto. Referring to FIG. 8B, the area 410 inside of the screen may include an upper left area 5, an upper central area 6, an upper right area 7, a central left area 8, a central center area 9, a central right area 10, a lower left area 11, a lower central area 12, and a lower right area 13. Meanwhile, predetermined areas of the area 410 inside the screen may also be classified into horizontal central areas 8, 9, and 10, and central vertical areas 6, 9, and 12.

FIG. 8C illustrates edge areas inside a screen. If there are a lot of contents displayed on a screen, the device 2000 may expand an area in which some contents are displayed, and may divide an area except the determined area. For example, the device 2000 may determine a central portion of the screen in which contents are displayed as a central area 18, and divide edge areas except the central area 18. The edge areas may include an upper left edge area 14, an upper central edge area 15, an upper right edge area 16, a central left edge area 17, a central right edge area 19, a lower left edge area 20, a lower central edge area 21, and a lower right edge area 22. Also, when the gaze of the user is located on the edge areas or located outside of the screen, the device 2000 may generate a control command based on eye movements of the user.

Figure 9:
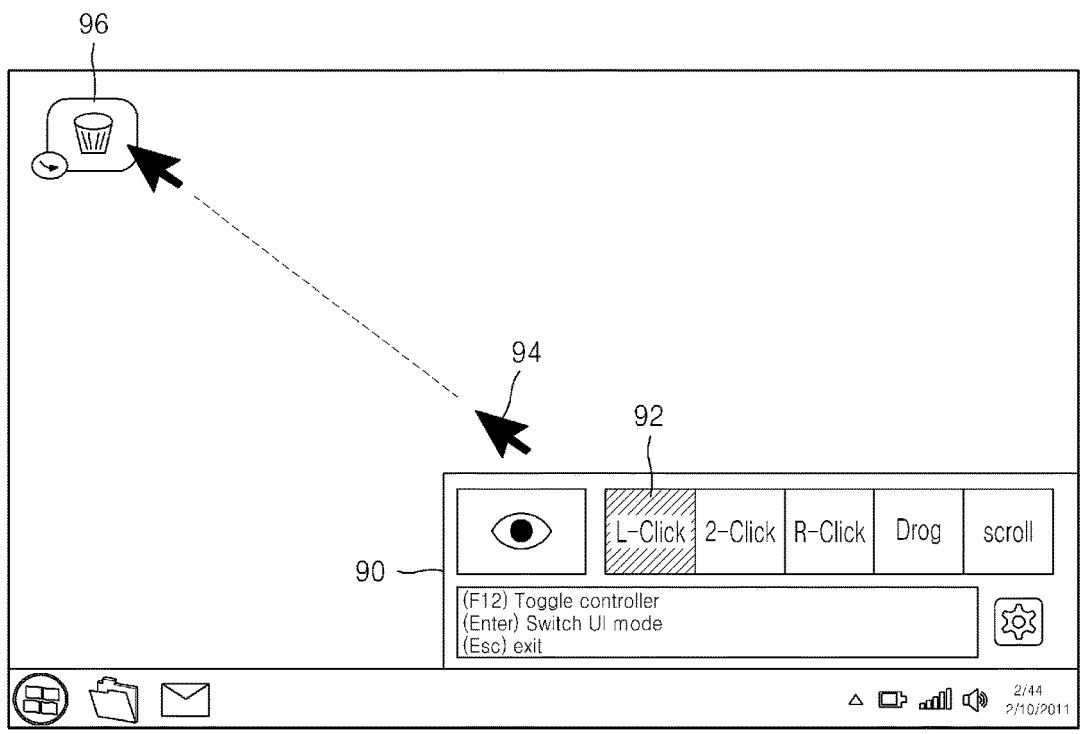
FIG. 9 is a diagram illustrating an operation of controlling a device based on eye movements using a selection window for selecting a control command according to an embodiment.

FIG. 9 is a diagram illustrating an operation of controlling the device 2000 based on eye movements using a selection window for selecting a control command according to an embodiment.

Referring to FIG. 9, the device 2000 may display a control command selection window 90 on a screen in order to generate a predetermined control command. The control command selection window may include a list of control commands corresponding to eye blinking, for example, a list of at least one control command corresponding to right click, left click, dragging, and scrolling. For example, when the user moves their eyes to select a left click field 92 (L-Click) of the control command selection window 90 via a cursor 94 and moves the cursor 94 to an icon 96 on the screen, and then blinks, the device 2000 may generate a control command to select the icon 96 via the right click.

Figure 10:
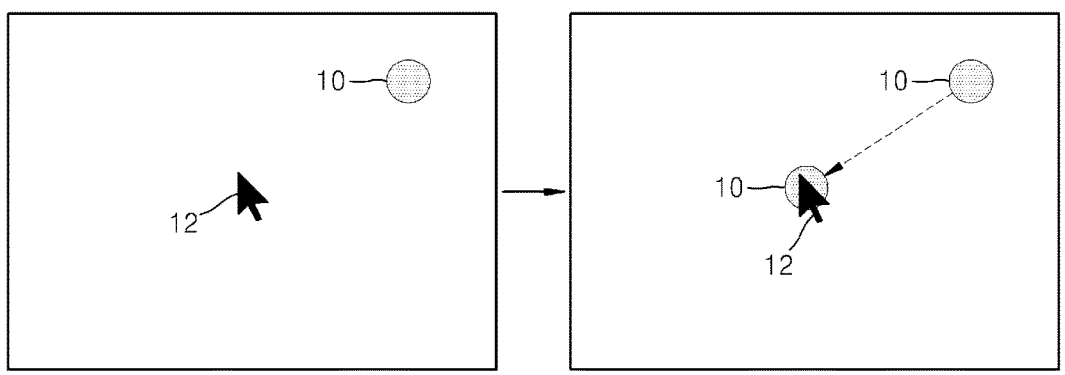
FIG. 10 illustrates an operation of correcting a position of a cursor corresponding to a user's gaze using a device according to an embodiment.

FIG. 10 illustrates an operation of correcting a position of a cursor corresponding to a user's gaze using the device 2000 according to an embodiment.

Referring to FIG. 10, when the user gazes at a predetermined location of the screen, a cursor 12 may be displayed at a position different from a position of the user's gaze. In this case, if the user gazes at the screen for five seconds or longer but does not blink, the device 2000 may correct the position of the cursor 12.

The device 2000 may fix the displayed cursor 12 in accordance with the position of the gaze 10 of the user. When the user moves the gaze 10 to the position of the fixed cursor 12 after fixing the cursor 12, the device 2000 may check the moved position of the gaze 10. Also, the user may blink once after moving the gaze 10 to the position of the cursor 12, and the device 2000 may match the position of the gaze 10 when blinking the eyes with the position of the fixed cursor 12.

Figure 11:
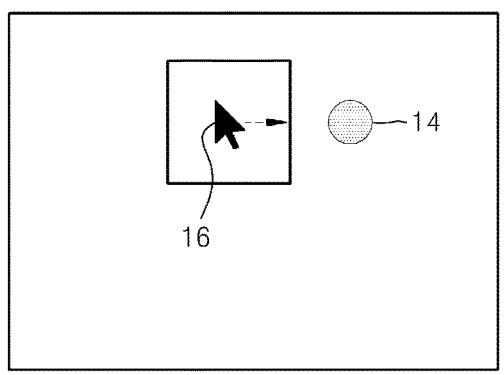
FIG. 11 illustrates an operation of minutely moving a cursor using a device according to an embodiment.

FIG. 11 illustrates an operation of minutely moving a cursor using the device 2000 according to an embodiment.

Referring to FIG. 11, when the user has their eyes closed for 1.5 seconds or longer and then opens them again, the device 2000 may display a predetermined area around a cursor 16 with a rectangular frame based on the eye movement after the opening of the eyes. Then, when a gaze 14 of the user is located at the right of the rectangle, the device 2000 may move the cursor 16 to the right at a speed equal to or lower than a previously set speed.

Figure 12:
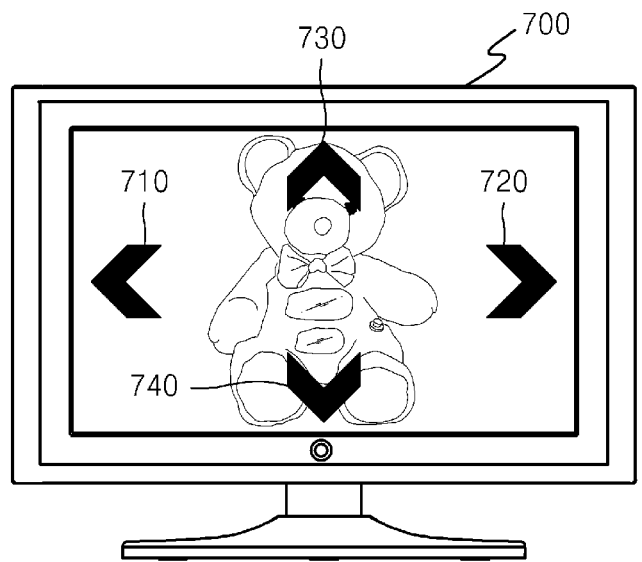
FIG. 12 is a diagram illustrating an operation of controlling a TV according to an embodiment.

FIG. 12 is a diagram of an operation of controlling a TV according to an embodiment.

As illustrated in FIG. 12, when the device 2000 is a TV, a controller corresponding to a TV may be selected. A controller corresponding to a TV may operate such that, when the user quickly blinks while gazing at a left-side area 1210 of a TV screen 1200 and then moves the eyes out to the left, a volume is reduced. Also, when the user quickly blinks while gazing at a right-side area 1220 and then moves the eyes out to the right, the volume is increased. As another example, when the user quickly blinks while gazing at an upper area 1230 and then moves the eyes out of an upper portion of the TV screen 1200, the number of a channel is increased, and when the user quickly blinks while gazing at a lower area 1240 and then moves the eyes out of a lower portion of the TV screen 1200, the number of the channel is reduced.

Figure 13:
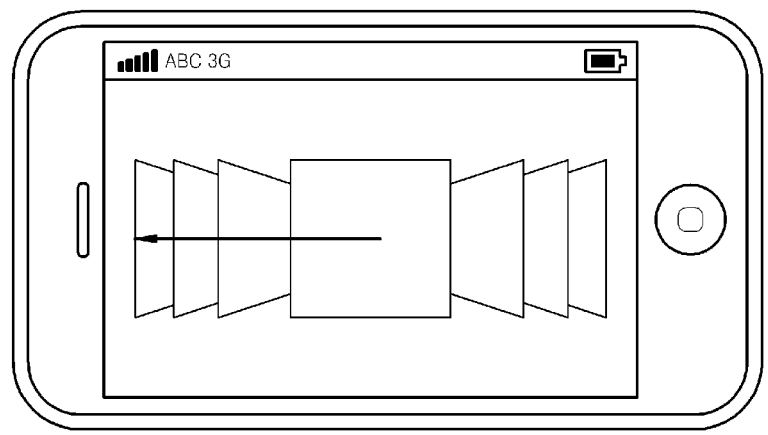
FIG. 13 is a diagram illustrating an operation of moving a list of contents displayed on a screen of a mobile terminal according to an embodiment.

FIG. 13 is a diagram illustrating an operation of moving a list of contents displayed on a screen of a mobile terminal according to an embodiment.

Referring to FIG. 13, when the user blinks while gazing at a list of contents displayed on the screen and then moves the gaze to the left, the list of contents may be swiped to the left.

Figure 14:
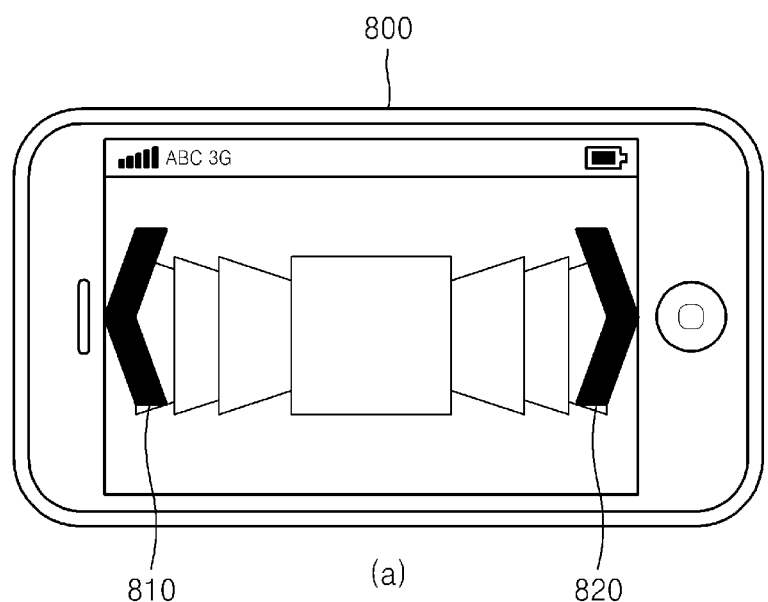
FIG. 14 is a diagram illustrating operations of controlling a mobile terminal according to embodiments.
Figure 14:
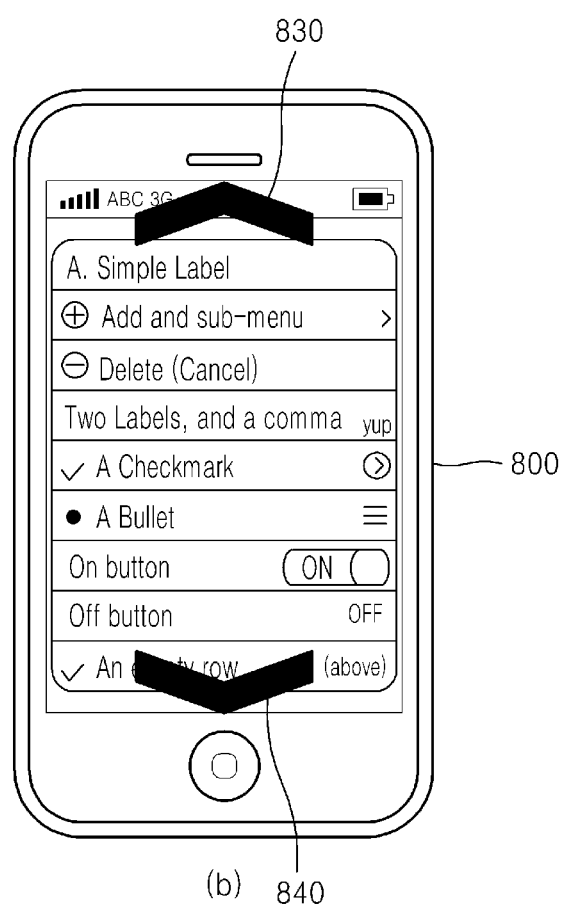

FIGS. 14A and 14B illustrate operations of controlling a mobile terminal according to an embodiment.

As illustrated in FIG. 14A, when the device 2000 is a mobile device, a touch input controller corresponding to the mobile device may be selected. In this case, the touch input controller may swipe a screen according to an eye action and eye gaze positions of the user in upward or downward directions, or to the left or right. Also, when the user blinks quickly a predetermined amount of time or more while gazing at a predetermined area, an object present in the predetermined area may be selected.

As illustrated in FIG. 14B, if there are a plurality of objects that can be selected by the user, it may be difficult for the user to accurately select an object by an eye action. Accordingly, the device 2000 may display a corresponding object when the user has selected the corresponding object via an eye gaze within a predetermined radius of the corresponding object.

Figure 15:
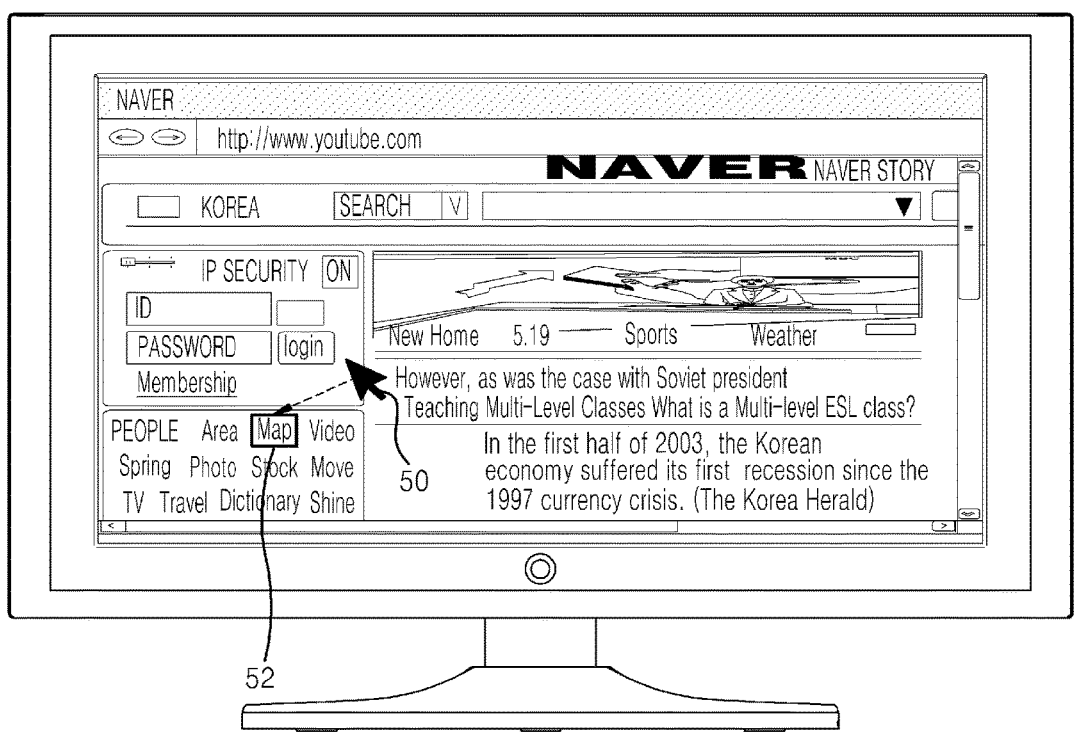
FIG. 15 illustrates an operation of moving a cursor located within a predetermined area from an object displayed on a screen of a device to the object, according to an embodiment.

FIG. 15 illustrates an operation of moving a cursor located within a predetermined area from an object displayed on a screen of the device 2000 to the object, according to an embodiment.

Referring to FIG. 15, when a web page is displayed on a screen of the device 2000 and a cursor 50 is located around a predetermined object 52, the cursor 50 may be moved to a position of the object 52. Accordingly, even when the user does not move a gaze accurately to the position of the object 52, the cursor 50 may be effectively located at the object 52, and an object may be selected so that the device 2000 may perform a predetermined operation.

Figure 16:
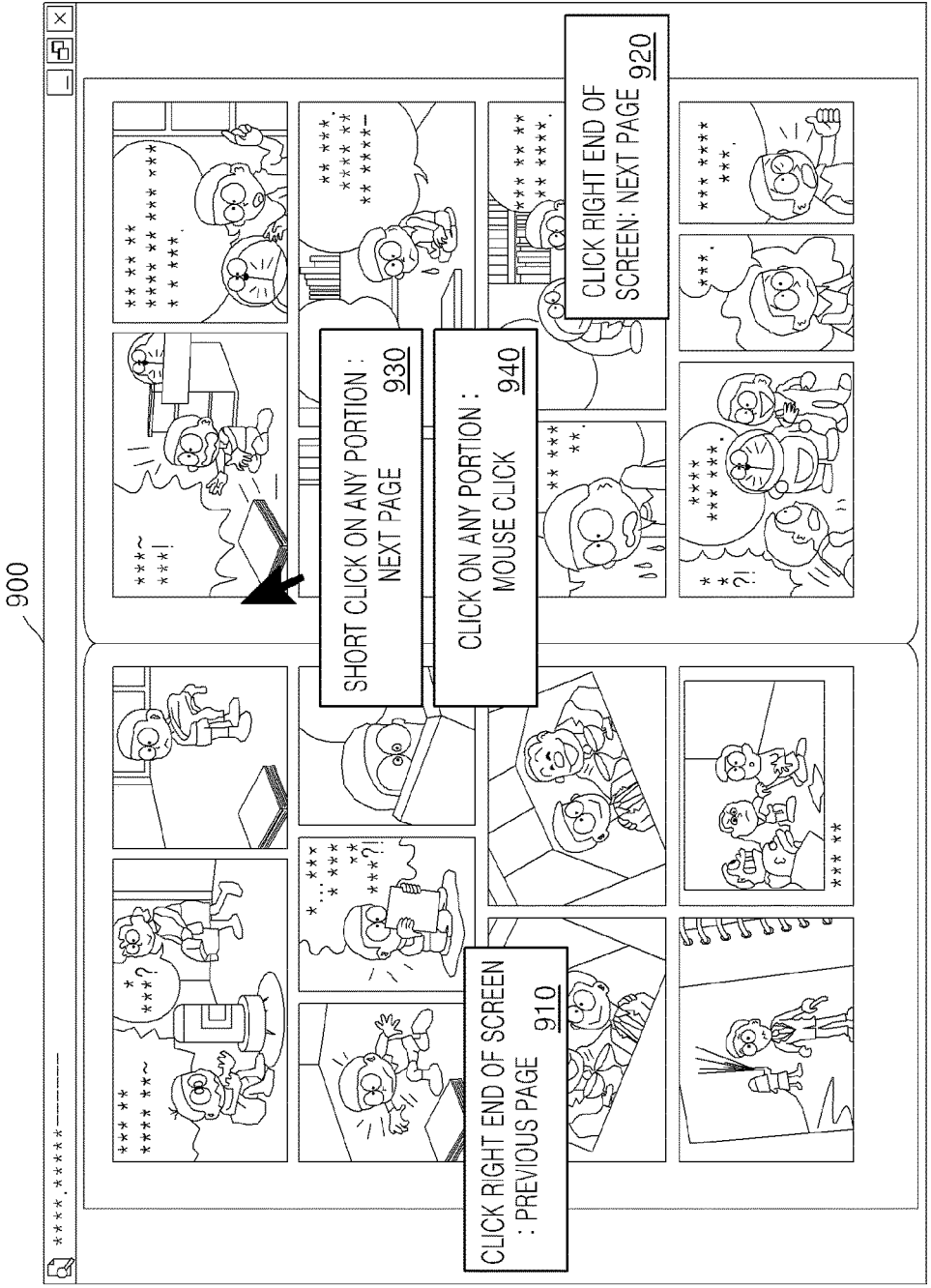
FIG. 16 is a diagram illustrating an operation of controlling an electronic book (e-book) terminal according to an embodiment.

FIG. 16 is a diagram illustrating an operation of controlling an e-book terminal according to an embodiment.

As illustrated in FIG. 16, when the user closes their eyes and opens them again while gazing at a left edge of a screen, the controller corresponding to an e-book displays a previous page (910). Also, when the user closes their eyes and opens them again while gazing at a right edge of a screen, the controller may display a next page (920). Also, when the user has their eyes closed less than a predetermined period of time and then opens again while gazing at any area of a screen (short_click), the controller may display a next page (930). In addition, when the user closes their eyes and opens them again while gazing at any area of a screen (click), the controller may display contents by expanding the contents by a predetermined ratio (940).

Figure 17:
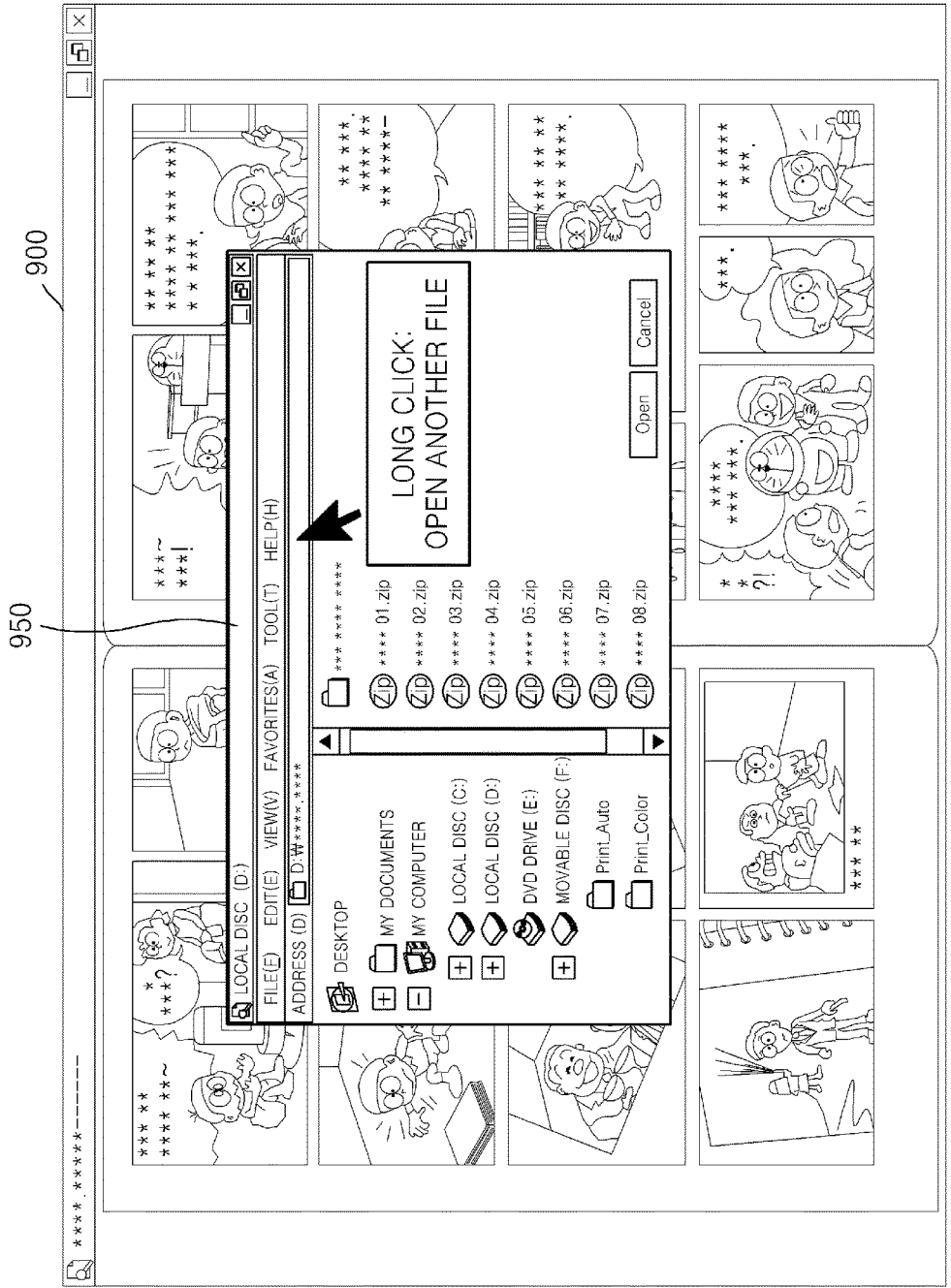
FIG. 17 is a diagram illustrating an operation of controlling an e-book terminal according to another embodiment.

FIG. 17 is a diagram illustrating an operation of controlling an e-book terminal according to another embodiment.

As illustrated in FIG. 17, when the user opens the eyes after closing them for a predetermined period of time or longer (long_click), the controller corresponding to an e-book may display a contents list via which other contents may be selected (950).

Figure 18:
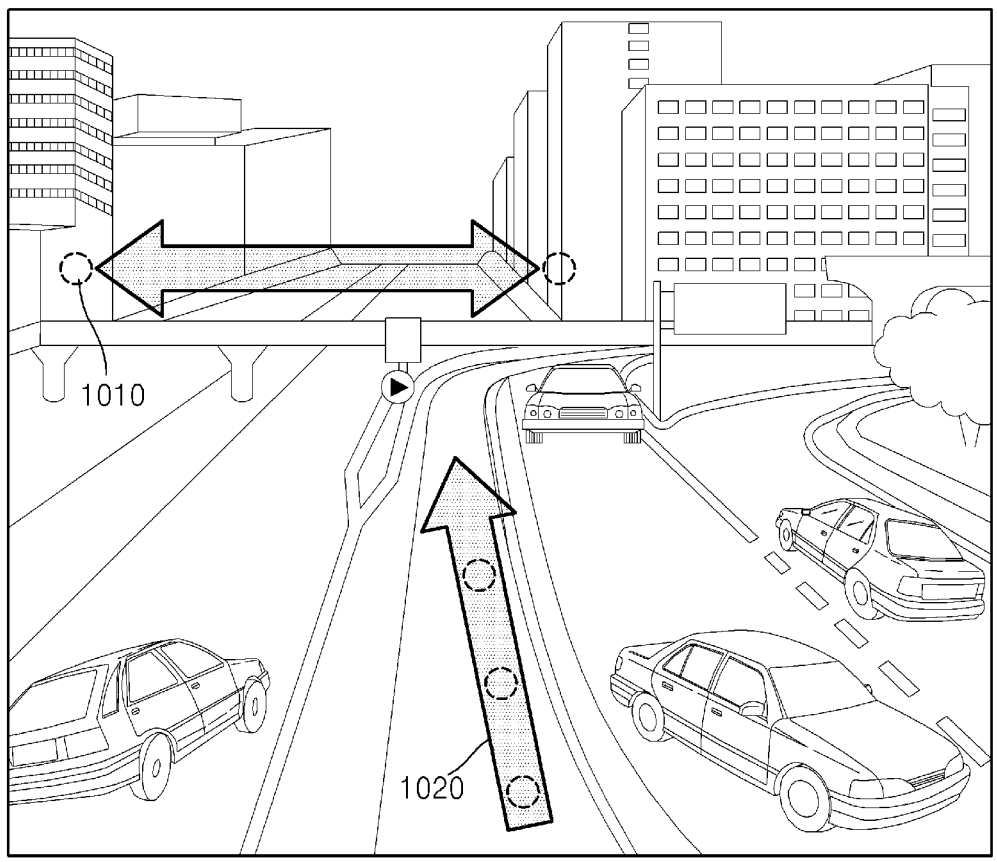
FIG. 18 is a diagram illustrating an operation of controlling a map application using a device according to an embodiment.

FIG. 18 is a diagram illustrating an operation of controlling a map application using the device 2000 according to an embodiment.

As illustrated in FIG. 18, an application selected by the user is a map application. When a user's gaze changes, the device 2000 may display a map screen obtained by photographing an area corresponding to the changed gaze position of the eyes (1010). For example, when the user's gaze moves to a predetermined building located along a road on a map, a front picture of the building corresponding to the gaze may be displayed on a screen.

Also, when the user blinks while gazing in a predetermined direction, the device 2000 may display a map screen that moves according to changes in the gaze of the user (1020). For example, when the user blinks while gazing at a predetermined position along a road displayed on the map, the device 2000 may display on the screen a picture of the road photographed at the position of the gaze of the user.

An embodiment may also be realized in a form of a recording medium including commands executable by a computer, such as a program module executed by a computer. A computer-readable recording medium may be an arbitrary available medium accessible by a computer, and may be any one of volatile, nonvolatile, separable, and non-separable media. Also, examples of the computer-readable recording medium may include a computer storage medium and a communication medium. Examples of the computer storage medium include volatile, nonvolatile, separable, and non-separable media realized by an arbitrary method or technology for storing information about a computer-readable command, a data structure, a program module, or other data. The communication medium may include a computer-readable command, a data structure, a program module, other data of a modulated data signal, such as carrier waves, or other transmission mechanisms, and may be an arbitrary information transmission medium.

While the description has been particularly shown and described with reference to embodiments thereof, it will be understood by those of ordinary skill in the art that various changes in form and details may be made therein without departing from the spirit and scope of the invention as defined by the appended claims. The embodiments should be considered in a descriptive sense only and not for purposes of limitation. For example, each element described as a single type may be distributed, and similarly, elements described to be distributed may be combined.

The scope of the invention is defined not by the detailed description but by the appended claims, and all differences within the scope will be construed as being included in the present invention.

What is claimed is:

1. A method of controlling a device comprising:
 receiving eye movement information of a user;
 dividing a display of the display device except an area in which contents are displayed into a plurality of areas;

identifying a gazed position within a display area of the device based on the eye movement information of the user;

identifying an area of the plurality of areas, based on the gazed position;

determining whether a control command is associated with the area that is identified; and controlling an operation of the device based on the control command in response to determining that a control command is associated with the area that is identified.

2. The method of claim 1, wherein the method comprises generating the control command based on an area gazed at by the user from among the divided areas and a movement direction of the gaze of the user from the area gazed at by the user.

3. The method of claim 1, wherein the determining the control command comprises identifying the control command based on gazed position from the display to an area outside of the display.

4. The method of claim 1, further comprising:

displaying a control command selection window comprising a list of control commands on a display of the device;

sensing a selection of a control command from the control command list included in the control command selection window based on a user input via the displayed control command selection window; and moving a cursor on the display of the device to a predetermined object based on the eye movement information of the user; and wherein the determining comprises identifying the control command corresponding to the selected control command with respect to the object in response to an eyelid movement by the user.

5. The method of claim 1, further comprising:

fixing a position of a cursor corresponding to the gazed position; and moving a position of the cursor to correspond to a moved the gazed position, in response to the eye movement information of the user.

6. The method of claim 1, further comprising:

displaying a previously set area around a cursor based on a user input; and moving a cursor based on the gazed position with respect to the displayed area.

7. The method of claim 1, further comprising:

moving a cursor to an object in response to the cursor being moved based on the eye movement information to an area that is located within a previously set range of the object on the display of the device.

8. A non-transitory computer readable medium comprising a computer program that is executable by a computer to perform the method of claim 1.

9. The method of claim 1, wherein the gazed position and an eyelid movement information are determined based on the eye movement information, and the control command is generated based on the position of the gaze, the movement direction of the gaze, and the eyelid movement information.

10. A device for operating based on eye movements of a user, the device comprising:

a memory storing instructions; and a processor configured to execute the instructions to implement:

a screen divider configured to divide the display except an area in which contents are displayed into a plurality of areas;

an eye movement information receiver configured to receive information about eye movements of a user, identify a gazed position within a display area of the device based on the eye movement information of the user, and a control command generator configured to identify an area of the plurality of areas, based on the gazed position, determine whether a control command is associated with the area that is identified, and control an operation of the device based on the control command in response to determining that a control command is associated with the area that is identified.

11. The device of claim 10, wherein the processor is configured to identify the control command based on a movement of a gaze of the user as the gazed position moves from the display to an area outside of the display.

12. The device of claim 10, further comprising:

a display configured to display a control command selection window including a list of control commands corresponding to an eyelid movement of the user; and a sensor configured to sense a user input via the displayed control command selection window and the eyelid movement of the user to select a control command from the list, wherein the processor is configured to identify the control command corresponding to the sensed selected control command with respect to an object placed at a position of a cursor.

13. The device of claim 10, wherein the processor configured to correct a position of a cursor on a display corresponding to a gaze of the user and match a position of a moved gaze of the user with the position of the cursor, in response to a movement of the gazed position.

14. The device of claim 10, further comprising:

a display configured to display a previously set area around a cursor based on a user input; and an input adjuster, wherein the processor is configured to move the cursor with respect to the displayed area, based on a direction of a position at which the gazed position is located.

15. The device of claim 10, further comprising:

a display configured to move a cursor on the display to an object on the display, in response to the cursor being moved based on the eye movement information to an area that is located within a previously set range of the object on the display of the device.

16. The device of claim 10, wherein the processor is configured to determine the gazed position and an eyelid movement information based on the eye movement information, and generate the control command based on the position of the gaze, the movement direction of the gaze, and the eyelid movement information.

17. A non-transitory computer-readable medium having stored thereon instructions executable by a device to cause the device to:

receive eye movement information of a user;

divide a display of the device except an area in which contents are displayed into a plurality of areas;

identify a gazed position within a display area of the device based on the eye movement information of the user;

identify an area of the plurality of areas, based on the gazed position;

determine whether a control command is associated with the area that is identified; and control an operation of the device based on the control command in response to determining that a control command is associated with the area that is identified.

\* \* \* \* \*